3,796,611
SOLDER FLUX
John J. O'Brien, 66 Emerson Road,
Watertown, Mass. 02172
Filed May 26, 1971, Ser. No. 146,871
Int. Cl. B23k 35/36
U.S. Cl. 148—23                        5 Claims

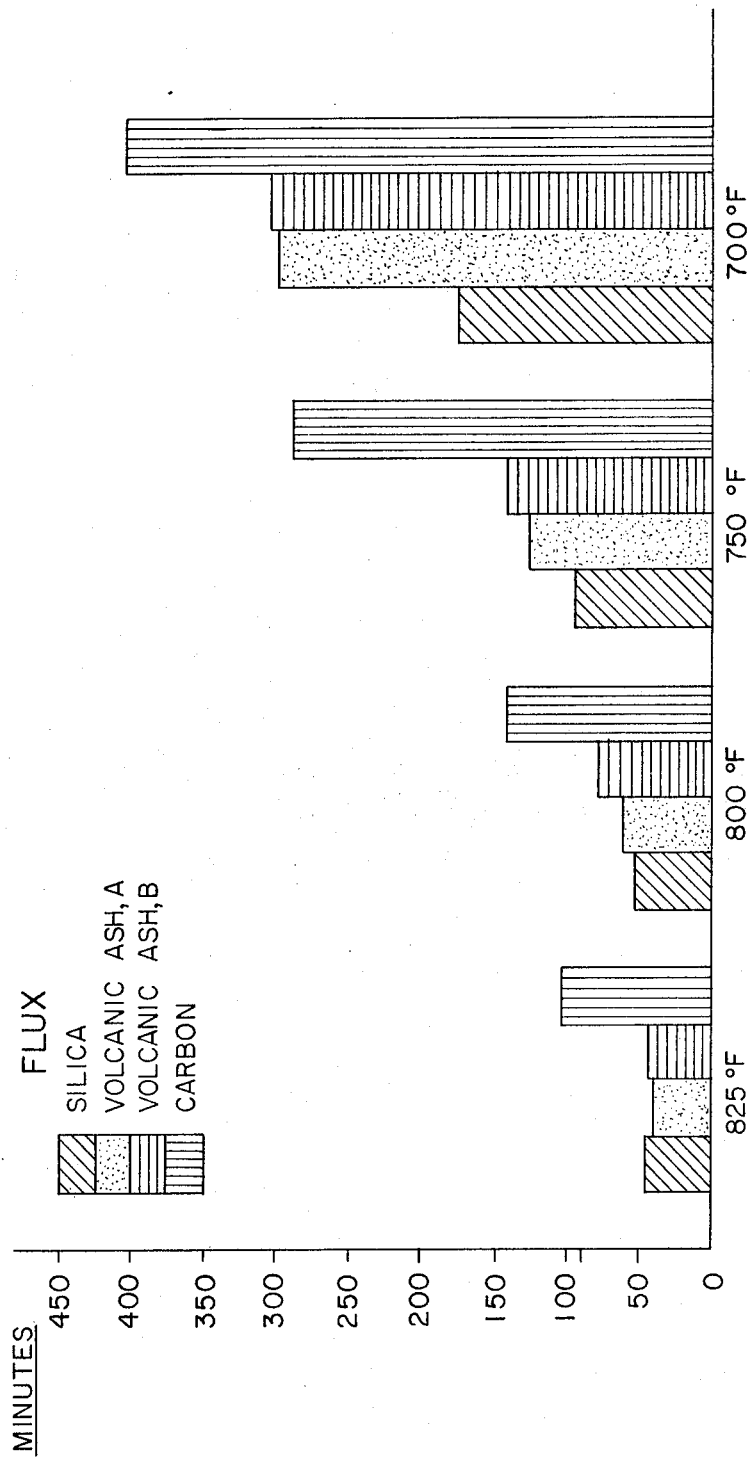

ABSTRACT OF THE DISCLOSURE

Zinc ammonium chloride type fluxes can be made that have longer life and reduced smoke characteristics by incorporating 1.5 to 5% carbon into conventional fluxes for use on metal container side seam soldering baths.

THE PRIOR ART

In the manufacture of sanitary can bodies, suitably notched sheet metal blanks are fed to a forming station where they are shaped and where the opposed marginal edges which ultimately form the side seam of the can are reversely bent into oppositely directed body hooks. The body hooks are then interengaged and flattened by bumping to form an interlocked seam. After this forming operation, the can bodies are conveyed in longitudinal spaced relationship over a rotating solder roll which engages against the seam of the bodies as they are moved edgewise therealong. The solder roll, partially submerged in a bath of molten solder, raises the solder in a film and wipes it into the side seam. Ordinarily, the molten solder is maintained at a temperature considerably in excess of its melting point so that it will remain fluid until capillarity has drawn enough liquid into the seam to flood it.

In order to keep the surface of the solder roll clean and "tinned," it is customary to use a flux on the side of the bath where the roll enters the solder. For this purpose, the flux employed must be capable of efficiently removing oxide coatings and other interfering films from the roll so as to create surface conditions which will permit the molten solder to flow freely and spread completely over the working surface of the roll. Also, the flux must have a reasonably long pot life, i.e., the wetting properties and cleaning efficiency of the flux should extend over a period of several hours under the operating conditions employed.

Because of the low tin-content solders used in the can making industry today, solder baths must be maintained at comparatively high temperatures. For example, the tin-lead solders currently employed contain about 5 percent or less tin and have a melting point in excess of 600° F. Therefore, the soldering baths must be maintained at a temperature in the range of between about 670° and 780° F., and usually between about 725° and 760° F. so that the molten solder will have the flow characteristics necessary to allow a sufficient amount of material to enter the body seams to provide the necessary hermetic seal.

While various fluxes have been employed with tin-lead solders, zinc-ammonium chloride fluxes are most widely used. One of the most satisfactory fluxes of this type contains a body of low density, inert, granular siliceous particles capable of absorbing the fused zinc-ammonium salts. This flux, compared to an identical composition without a siliceous granular absorber, is active over longer periods of time under similar operating conditions. Presumably, the granular mass serves as a heat insulator which lowers the temperature of the crystal surface over the solder surface temperature. Also, the individual siliceous particles appear to serve as nuclei for the condensation of ammonium chloride. The volatilization of the latter substance is thereby reduced, thus extending its availability for regeneration of the fluxing power of the zinc chloride by reaction with the zinc oxychloride yielded by the reaction of zinc chloride and metal oxide on the solder roll surface. Due to its increased active life under various operating conditions, this flux has been widely used in can making and other applications where the articles to be soldered are passed over the solder roll at a comparatively rapid rate. However, in order to achieve and maintain top production speeds, the can making industry today prefers a flux having an even longer pot life especially at temperatures of 800° F. and higher so that there will be fewer delays for replenishing the spent flux. Also, ecological and health considerations indicate the need for sensible reduction in the production of the corrosive smoke which normally attends can tinning operations.

SUMMARY OF THE INVENTION

Fluxes capable of extended life with significantly reduced smoke production can be prepared for use on high temperature solder baths by incorporating finely divided carbon into conventional zinc ammonium chloride fluxes. It has been found that carbon-containing fluxes can have a materially increased life at temperatures of 750° to 825° F. as compared to that of non-carbon fluxes. It has also been discovered that the emission of corrosive smoke can be substantially diminished when the substitution is effected.

The fluxes of the invention thus comprise essentially at least 60% by weight of a mixture of zinc chloride and ammonium chloride to which the ammonium salt contributes between about 44 and 54% of the weight, and about 1.5 to 5% of a finely divided carbon powder. Other ingredients such as zinc oxide or zinc carbonate, light weight particulate siliceous material, alkali metal salts and certain organic resins are advantageously incorporated in conventional proportions.

DETAILED DESCRIPTION

In preparing the flux of the present invention, zinc chloride and ammonium chloride may be combined in the various proportions known to the art. However, because of its regenerative function, the ammonium chloride preferably constitutes at least about 44% by weight of the total quantity of these two salts, with the best results obtained within the range of 44 to 54% by weight since quantities greater than 54% tend to increase the fusion temperature to the point that the flux does not melt easily below soldering temperatures. The desired proportions may be achieved by adding the single salt ($ZnCl_2$ and $NH_4Cl$), the double salt ($ZnCl_2 \cdot 2NH_4Cl$), the triple salt $$(ZnCl_2 \cdot 3NH_4Cl)$$

or mixture of these single, double and triple salts.

The total amount of zinc chloride-ammonium chloride mixture used in the flux may vary over a wide range depending upon the other ingredients employed. However, the composition should contain at least about 60% by weight of this chloride mixture in order that rapid and effective removal of metal oxide film from the solder roll surface be insured.

In addition to the zinc ammonium chloride component just described, the flux of the invention must contain, on a weight basis, from about 1.5 to 5%, preferably 2 to 4%, of a finely divided carbon powder. This powder may be a naturally fine substance such as carbon black, lampblack and acetylene black, or it may consist of a coarser material such as calcined petroleum coke that has been crushed to a fine powder, for instance to −16 mesh.

The flux of the invention may also contain the lightweight particulates siliceous material conventionally used in this type of composition. Such material can constitute up to about 12% of the composition's weight. Perlite is preferred, although other inert low density materials can also be employed, including exfoliated vermiculite, pumice, diatomaceous earth and the like.

The flux of the invention may contain alkali metal chlorides including for example sodium chloride, potassium chloride and mixtures thereof, for melt temperature adjustment and maximization of flux life, as taught in U.S. Pat. 3,380,862, in quantities of up to about 20% of the total flux weight. Zinc oxide or zinc carbonate may be incorporated also to prevent caking on storage and minimize the release of ammonium chloride fumes during soldering. The quantity of zinc compounds needed to achieve the desired result is usually about 5% of the composition's weight and may range from about 5 to 25%.

It is advantageous to include as well a minor quantity of resin in the composition to increase the flux life. The resin employed must have the essential property of melting before it begins to decompose upon being heated to fluxing temperatures. At soldering temperature, the resin forms a scum on the surface of the flux which renders the flux mass less permeable to air and contributes some resistraint on the escape of ammonium chloride vapor. The resins employed for this purpose generally have a melting point in the range of about 250° to 360° F. and are used in an amount of between about 0.1 and 1.0 weight percent of the flux composition. Among the resins which may be used is the gasoline-insoluble resin obtained from the extraction of pine wood in aromatic solvents; the hard, dark-colored, partially gasoline-soluble fraction obtained as a by-product in the manufacture of grade FF wood rosin; and the so-called "modified" resoles of the phenolformaldehyde condensation type. Particularly useful phenol-formaldehyde resins are the resoles modified with rosin esters. Specific rosin ester-modified resoles include the "Beckacite" resins, such as "Beckacite No. 1100," a resole modified with glycerine ester of rosin and the "Pentacite" resins, such as "Pentacite No. 1405," a resole modified with the pentaerythritol ester of rosin.

The following examples are provided to illustrate the flux compositions of the invention.

Examples 1 to 4

Several flux formulations were prepared with the 2:1 ammonium-zinc chloride double salt ($ZnCl_2 \cdot 2NH_4Cl$), zinc oxide, and one or more other ingredients selected from expanded volcanic ash (perlite), silica, carbon black and resin. The nature and proportion of each ingredient employed is tabulated below as well as the pot life observed for each formulation when used at 700°, 750° 800° and 825° F. on a conventional solder bath.

The specific ingredients employed, apart from the double salt and the zinc oxide, can be further described as follows:

The silica (Example 1) is prepared with commercial activated silica gel 6–16 mesh U.S. granules, 3:1 crystals ($ZnCl_2 \cdot 3NH_4Cl$), ammonium chloride and water in the manner of Example 2 of U.S. Pat. 3,350,244. It is then mixed with the other ingredients shown in the table below.

The volcanic ash (perlite) used in the present formulation is of two types which differ only with respect to particle size distribution. Volcanic ash A (Example 2) is an expanded particulate material with a particle size distribution such that none of the material is retained on a No. 4 mesh screen (U.S. Standard series) while only 1.5% of it passes through a No. 10 mesh screen. Volcanic ash B (Example 3) on the other hand, is a finer material with the bulk of its particles being retained on screens No. 16, 30 and 50.

The carbon used in Example 4 was a channel black fluff with a surface area of 105 m.²/g., a particle diameter of 27 millimicrons, a carbon content of 95% and a volatile content of 5%.

PARTS BY WEIGHT

| | Examples | | | |
|---|---|---|---|---|
| | 1 | 2 | 3 | 4 |
| Ingredients: | | | | |
| $ZnCl_2 \cdot 2NH_4Cl$ | 730 | 894 | 894 | 894 |
| ZnO | 39 | 72 | 72 | 72 |
| Silica | 231 | | | |
| Perlite | | [1] 32 | [2] 32 | |
| Carbon | | | | 32 |
| Resin | | 2 | 2 | 2 |

POT LIFE (MINUTES)

| Temperature, ° F.: | | | | |
|---|---|---|---|---|
| 825 | 47 | 40 | 45 | 105 |
| 800 | 53 | 62 | 75 | 140 |
| 750 | 90 | 128 | 135 | 284 |
| 700 | 173 | 298 | 308 | 405 |

[1] Coarse.
[2] Fine.

These results have been graphically illustrated in the accompanying drawing. On examination, it becomes evident that while the pot life of the carbon black flux of Example 4 is superior to that of the siliceous materials at all temperatures, the improvement in life under operating conditions is in fact greater than 100% at temperatures of 750° and higher.

Examples 5 to 10

Various flux compositions prepared essentially as that of Example 4 but with carbon powder of different sources were tested on a molten solder bath for smoke emission and compared to a standard non-carbon flux of the type described in Example 3. The smoke emission was estimated by means of the following scale:

(1) Very high: large dense clouds.
(2) High: dense clouds.
(3) Moderate: thin clouds.
(4) Low: a few thin puffs.
(5) Very low: wisps.

The carbon used and the smoke performance observed are listed in the next table.

SMOKE EMISSION

| Example | Powder additive [1] | Life at 825° F. | Smoke reading |
|---|---|---|---|
| 5 | Perlite, fine | 45 | [2] 1 |
| 6 | Channel black A | 120 | 3 |
| 7 | Channel black B | 105 | 4 |
| 8 | Channel black C | 105 | 3 |
| 9 | Furnace black A | 105 | 3 |
| 10 | Furnace black B | 105 | 4 |

[1] Channel black A, B and C and furnace black B are products of the Cabot Corporation marketed respectively as Elf 8, Elf 6, Monarch 81 and Elftex 5. Furnace black A is marketed by Columbian Carbon Co. as Statex Black.
[2] Worst.

While variations were noted in pot life and smoke abatement for different carbon powders of various types and commercial origins, definite improvement was generally observed in either or both of these respects when carbon was substituted or used in addition to the siliceous material of the art. Even the least satisfactory of the carbon fluxes performed as well as the conventional preparations.

Example 11

A carbon-containing flux prepared according to the formula of Example 4 was tested in a can manufacturing plant under normal industrial conditions on two can assembly lines with different solder pot lengths. The capacity of each line was of 515 beer/beverage cans per minute. The solder contained 98.5% lead and 1.5% tin and was kept at a middle pot temperature of 750±5° F. The performance of the carbon flux under the conditions just indicated is compared to that of a standard perlite flux in the same two production lines.

INDUSTRIAL TEST STATISTICAL DATA

|  | Carbon flux | Perlite flux |
|---|---|---|
| Length of run, days (8-hr. shifts) | 16 | 17 |
| Flux consumed, pounds | 112.5 | 162 |
| Cans produced | 2,212,000 | 2,797,000 |
| Average day: | | |
| Flux consumed, pounds | 7.0 | 9.5 |
| Cans produced | 138,000 | 165,000 |
| Cans/pound flux | 20,000 | 17,000 |
| Pound flux/1,000 cans | 0.05000 | 0.0588 |

The greater efficiency of the carbon-containing flux in can/flux terms becomes evident on examination of the above results, even at relatively moderate soldering bath temperatures; i.e. about 750° F. At higher temperatures, improvement of greater magnitude can be foreseen on the basis of the results shown in the earlier examples.

In addition to the above quantitative superiority of the carbon-containing flux, which is really a result of the longer pot life of a given amount of flux, it was noted that the carbon flux smoked significantly less, required less attention and kept the soldering bath cleaner than the perlite flux.

What is claimed:

1. A solder flux comprising, on a weight basis, at least 60% of a zinc chloride-ammonium chloride mixture containing between about 44 and 54% of ammonium chloride, and between about 1.5 and 5% of a finely divided carbon selected from the group consisting of channel black, furnace black and mixtures thereof.

2. A flux as in claim 1 wherein the carbon is present at a concentration within the range of about 2 to 4%.

3. A flux as in claim 1 wherein an inert lightweight particulate siliceous material constitutes up to 12% by weight of the composition of the flux.

4. A flux as in claim 1 wherein there is contained between about 0.1 and 1.0% of a resin capable of melting before it decomposes while being heated to fluxing temperatures.

5. A flux as in claim 1 wherein there is contained between about 1.5 and 22.5% by weight of an alkali metal chloride or a mixture of alkali chlorides.

References Cited

UNITED STATES PATENTS

| | | | |
|---|---|---|---|
| 3,380,862 | 4/1968 | O'Brien | 148—23 |
| 3,321,339 | 5/1967 | Schulze | 148—23 |
| 3,030,242 | 4/1962 | Gieselman et al. | 148—23 |
| 2,662,840 | 12/1953 | Schilling et al. | 148—23 |
| 1,416,871 | 5/1922 | Pyle | 148—23 |
| 1,453,586 | 5/1923 | Hearne | 148—23 |
| 1,556,968 | 10/1925 | Smith | 148—23 |
| 1,763,417 | 6/1930 | Clarke | 148—23 X |

ANTHONY SKAPARS, Primary Examiner

U.S. Cl. X.R.

148—26